United States Patent
Kennedy et al.

(10) Patent No.: US 9,654,965 B2
(45) Date of Patent: May 16, 2017

(54) REGULATORY COMPLIANCE FOR WIRELESS DEVICES

(71) Applicant: BlackBerry Limited, Waterloo (CA)

(72) Inventors: Richard Howard Kennedy, Austin, TX (US); James Randolph Winter Lepp, Kanata (CA); Stephen McCann, Southhampton (GB); Michael Peter Montemurro, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 219 days.

(21) Appl. No.: 14/021,872

(22) Filed: Sep. 9, 2013

(65) Prior Publication Data
US 2015/0071268 A1    Mar. 12, 2015

(51) Int. Cl.
| | |
|---|---|
| *H04W 4/00* | (2009.01) |
| *H04W 8/08* | (2009.01) |
| *H04W 64/00* | (2009.01) |
| *H04W 88/08* | (2009.01) |
| *H04W 4/02* | (2009.01) |
| *H04W 8/20* | (2009.01) |

(Continued)

(52) U.S. Cl.
CPC .............. *H04W 8/08* (2013.01); *G06F 17/30* (2013.01); *H04W 4/001* (2013.01); *H04W 4/02* (2013.01); *H04W 8/20* (2013.01); *H04W 48/20* (2013.01); *H04W 64/003* (2013.01); *H04W 88/08* (2013.01); *H04W 84/12* (2013.01)

(58) Field of Classification Search
CPC ... H04W 4/02; H04W 4/025; H04W 28/0226; H04W 48/04; H04W 4/00

USPC ........................................................ 370/338
See application file for complete search history.

(56) References Cited

U.S. PATENT DOCUMENTS 6,484,029 B2 * 11/2002 Hughes et al. ............... 455/434
7,346,338 B1 * 3/2008 Calhoun ............. H04L 63/1408
455/410

(Continued)

FOREIGN PATENT DOCUMENTS

| EP | 1983778 A1 | 10/2008 |
|---|---|---|
| WO | WO 2013/130189 A1 | 9/2013 |

OTHER PUBLICATIONS

Written Opinion of the International Searching Authority and International Search Report mailed Nov. 24, 2014 for PCT Application No. PCT/CA2014/050848.

(Continued)

*Primary Examiner* — Ricky Ngo
*Assistant Examiner* — Dewanda Samuel
(74) *Attorney, Agent, or Firm* — Conley Rose, P.C.; J. Robert Brown, Jr.

(57) ABSTRACT

A wireless device may be subject to regulations based on the location (e.g. country). Accordingly, the wireless device may need to identify regulations for its current location. A lookup table or database that includes regulations for different locations may be used for identifying the regulations for the current location of the wireless device. The lookup table may be stored locally on the wireless device or retrieved over a network. The identified regulations may be used to modify certain operating parameters of the wireless device to comply with the local regulations and determine whether or not to associate with an incorrectly configured Access Point.

23 Claims, 3 Drawing Sheets

(51) Int. Cl.
   *G06F 17/30* (2006.01)
   *H04W 48/20* (2009.01)
   *H04W 84/12* (2009.01)

(56) References Cited

U.S. PATENT DOCUMENTS

| | | | | |
|---|---|---|---|---|
| 8,428,584 B2* | 4/2013 | Buckley | ............... | H04W 48/18 370/328 |
| 8,478,297 B2* | 7/2013 | Morgan et al. | ............ | 455/456.1 |
| 8,594,695 B2* | 11/2013 | Dunn | ............... | H04W 88/06 455/125 |
| 8,768,344 B2* | 7/2014 | Naguib et al. | ............... | 455/424 |
| 8,848,669 B2* | 9/2014 | Meier | ............... | H04W 8/005 370/331 |
| 2003/0100308 A1* | 5/2003 | Rusch | ............... | H04W 48/18 455/445 |
| 2004/0127240 A1* | 7/2004 | Li | ............... | H04W 48/18 455/500 |
| 2005/0037754 A1* | 2/2005 | Liu | ............... | H04W 48/16 455/435.3 |
| 2006/0009219 A1* | 1/2006 | Jaakkola | ............... | H04B 1/406 455/435.2 |
| 2006/0135067 A1 | 6/2006 | Dunko | | |
| 2007/0049323 A1* | 3/2007 | Wang | ............... | H04W 12/12 455/525 |
| 2008/0175209 A1 | 7/2008 | Abdel-Kader et al. | | |
| 2009/0067398 A1* | 3/2009 | Green et al. | ............... | 370/338 |
| 2009/0104889 A1* | 4/2009 | Lotvonen | ............ | H04L 63/1441 455/410 |
| 2009/0141660 A1* | 6/2009 | Hassan et al. | ............... | 370/310 |
| 2010/0210280 A1* | 8/2010 | Haynes | ............... | G01S 5/0205 455/456.1 |
| 2010/0323715 A1* | 12/2010 | Winters | ............... | G01S 5/0027 455/456.1 |
| 2011/0090887 A1 | 4/2011 | Kim et al. | | |
| 2012/0295632 A1* | 11/2012 | Karlsson | ............... | H04W 4/043 455/456.1 |
| 2013/0084885 A1* | 4/2013 | Jain | ............... | H04W 4/005 455/456.1 |
| 2013/0103684 A1 | 4/2013 | Yee et al. | | |
| 2013/0303232 A1* | 11/2013 | Thomas | ............... | H04W 52/146 455/550.1 |

OTHER PUBLICATIONS

European Extended Search Report; Application No. 14842131.6; Aug. 18, 2016; 9 pages.
Canadian Office Action; Application No. 2,923,509; Feb. 6, 2017; 3 pages.

* cited by examiner

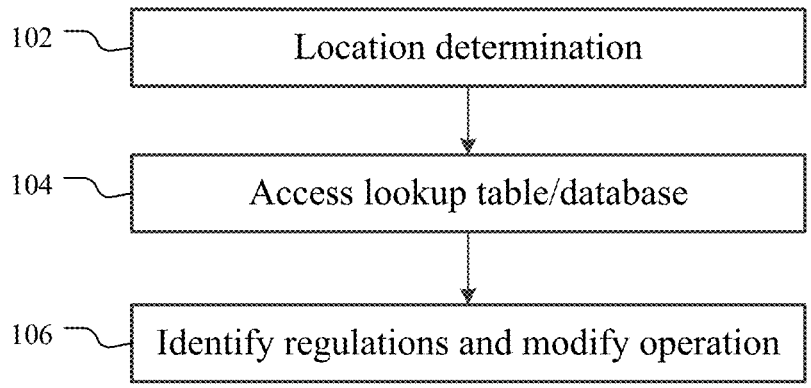
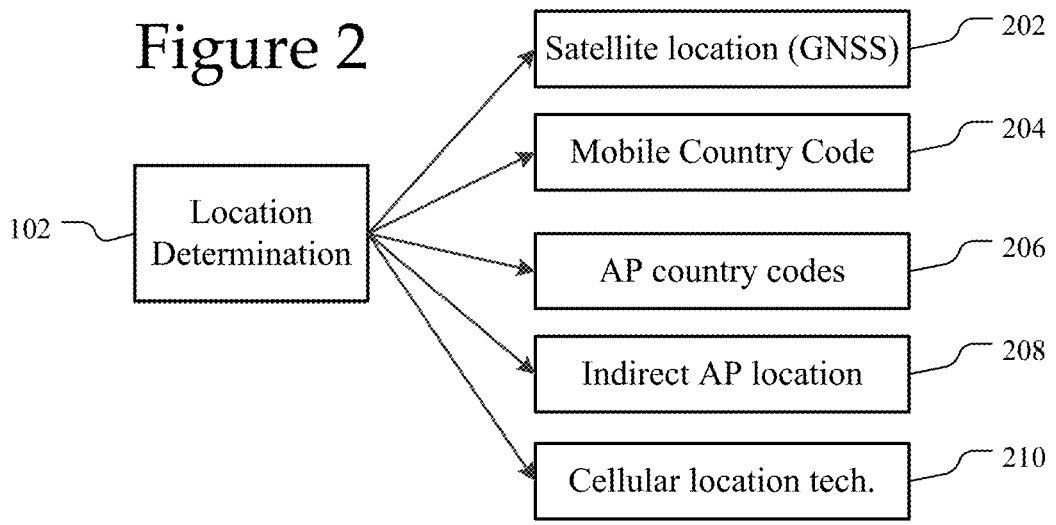
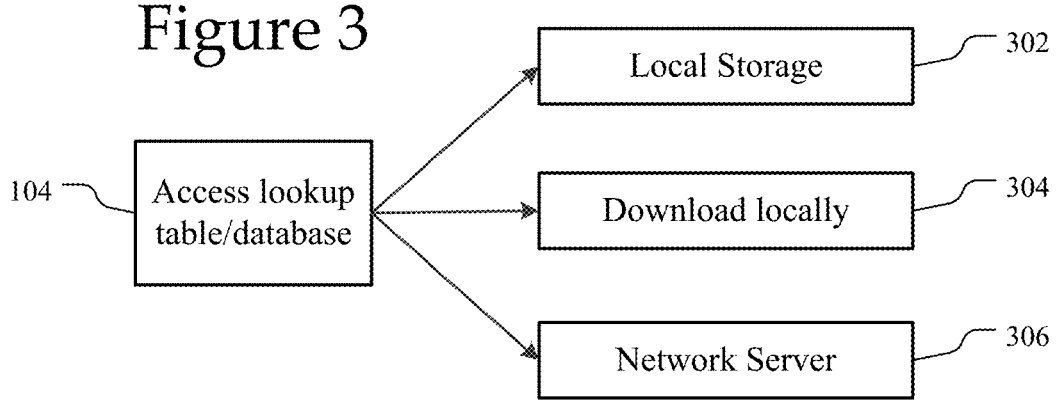

REGULATORY COMPLIANCE FOR WIRELESS DEVICES

BACKGROUND

Mobile devices (aka client devices or mobile computing platforms) may be operable across the globe but yet are expected to comply with local regulations. For example, the mobile devices may be operable in unlicensed spectrum which fails to satisfy the local regulations. In one example, IEEE 802.11 WLAN (also known as Wi-Fi™) mobile devices may be required to follow the lead of the Access Points ("APs") that they are associated with in order to ensure that they operate in compliance with local regulations. This may be necessary because regulations for unlicensed spectrum use are not globally harmonized. Certain locations rely only on the AP to ensure that mobile devices are in compliance with local regulations. For example, the United States (47 CFR 15.202) requires the APs (master devices) to operate in compliance with regulations and acknowledges that a mobile device may not be in compliance if the AP to which it associates is not operating in compliance.

A requirement that a mobile device follow the lead of the APs assumes that the APs are 1) aware of their own location, 2) are stationary, and 3) they are set up in compliance with the local regulations. The emergence of mobile APs (e.g. those with wireless backhaul), and the reality of rogue and/or improperly configured wireless networks reduces the certainty that APs and the mobile devices following them are indeed operating in compliance with local regulations. Additionally, peer to peer connections do not rely on any fixed AP and may not know which regulations are in effect at the current location.

BRIEF DESCRIPTION OF THE DRAWINGS

FIG. 1 illustrates a process for regulation identification;
FIG. 2 illustrates location determination;
FIG. 3 illustrates processes for accessing a lookup table.

DETAILED DESCRIPTION

Figure 4:
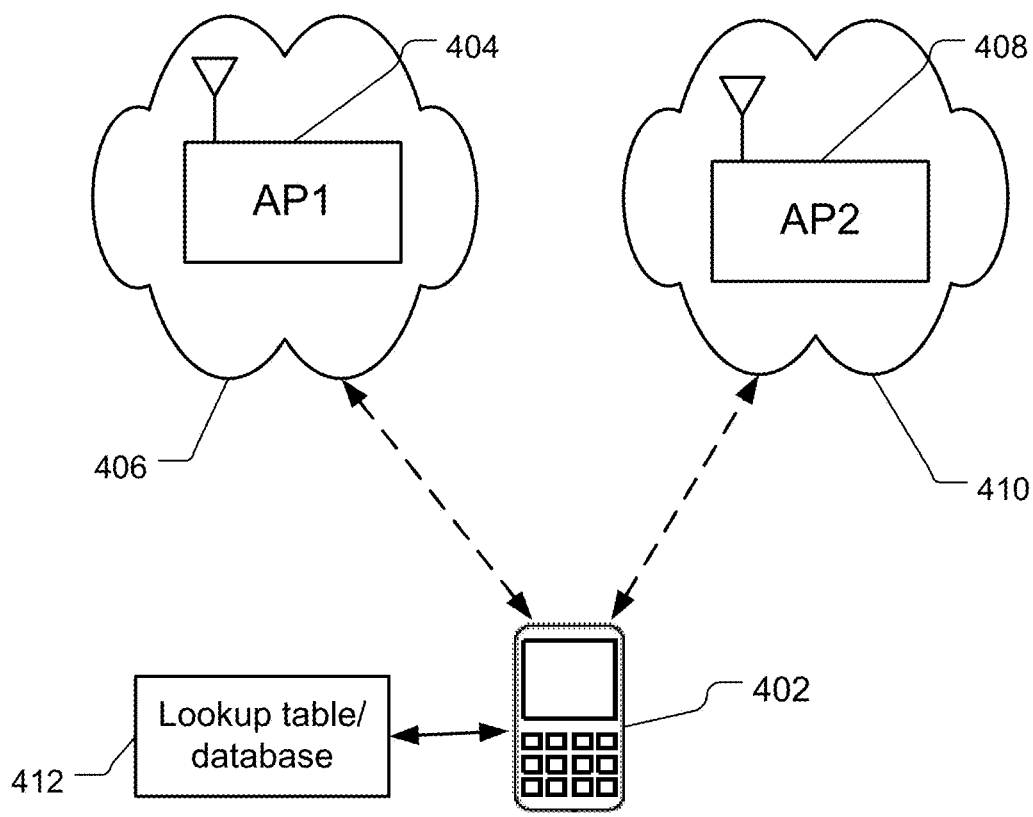
FIG. 4 illustrates a communication network.

Mobile devices may be able to operate in different locations with different regulations to ensure that the devices can be used in those different locations. However, reliance on the APs of those locations to ensure compliance may be inconsistent. In order to ensure compliance with local regulations, the mobile device may need to take responsibility for its operation, rather than relying on the AP. In one example, an AP in a wireless local area network (WLAN) of a touring rock band may operate in a dual band (2.4 and 5 gigahertz (GHz)) mode when set up (i.e., configured) in the United States. However, when transported to China for a concert, unless the WLAN country settings are changed to China (which may be a manual setting), the APs will operate illegally in the 5 GHz band. There is also the case of a rogue AP, for example, an AP using firmware downloaded from the Internet that can enable the operator to turn off Dynamic Frequency Selection (DFS) even though it may be a regulatory requirement for DFS to remain enabled to avoid interfering with radars, or to avoid operation on a channel prohibited by local regulations. Regulations may be updated to require mobile devices to be more adaptive to (or aware of) their location, and change their current operations to be in compliance with local regulations. When the mobile device is responsible for its own location determination and compliance with local regulations, there will be fewer compliance errors or intentional AP setups that would cause the mobile device to be non-compliant.

The disclosed devices, systems, and methods ensure compliance with local telecommunication regulations set by various telecommunication regulatory bodies. A wireless (mobile) device may be subject to (i.e., operate in accordance with) regulations or regulatory requirements associated with the geographic location (e.g. country) the wireless device is operating within. Accordingly, the wireless device may need to identify regulations for its current location. A lookup table or database that includes regulations for different locations (or at least regulation associated with one given location) may be used for identifying the regulations for the current location of the wireless device. The lookup table may be stored locally on the wireless device or retrieved over a network. The identified regulations may be used to modify certain operating parameters of the wireless device thereby enabling the wireless device to operate in compliance with the local regulations.

By using location information obtained from any of a number of possible sources available, a mobile device may determine that a channel set or other operational parameters are inappropriate for the local location, and ignore an AP that is broadcasting beacons enabling the mobile device to associate with the AP. The determination made by the mobile device may, for example, be based on a lookup table or database that associates a location or regulatory region with the corresponding regulations or with parameters governing the allowable operation of the device as described with respect to FIG. 1.

FIG. 1 illustrates a process for regulation identification. In block 102, there is a location determination performed at a mobile device. Rather than relying on an AP, which may be configured incorrectly for determining the operating location of the mobile device the mobile device may be able to determine its location through one or more other methods as illustrated in FIG. 2.

FIG. 2 illustrates exemplary location determination. In particular, the mobile device determines its current location. The location may be a country determination or may be a more localized identification when regulations differ amongst areas within a country (e.g. county, state, city, etc.).

In one example, the current location of the mobile device may be determined based on a location 202 of a satellite. The mobile device may include Global Navigation Satellite Systems ("GNSS") or other satellite-based location functionality. The satellite location determination may be through specific coordinates, or may have GNSS coordinates available via a peer device connection in areas where reliable GNSS coordinates cannot be ascertained. GNSS refers not only to the Global Positioning System (GPS) but more generally to any satellite-based location or navigation system (such as Galileo, Beidou, etc.).

In another example, the current location of the mobile device may be determined based on a mobile country code ("MCC") 204. A mobile device with cellular capability receives the MCC of the network to which the mobile device is attached to ascertain local regulatory domain of the mobile device for cellular service. This MCC for cellular service can also be used for the location determination procedure 102 for purposes of local regulatory compliance with other wireless networks (e.g. a Wi-Fi network).

In another example, the current location of the mobile device may be determined based on country codes 206 associated with APs or location information from a plurality of APs (e.g. FIG. 4). The location information provided by the APs may include information on the country code included within a beacon frame along with the maximum allowable transmit power, and/or the channels that may be used within the given regulatory domain. Based on a plurality of examined country code elements, the mobile device may assume (i.e., determine) that since the majority of these examined country code elements include the same country code, this country code represents the correct country code of the current location. In particular, if the mobile device receives communications from a plurality of APs, it is unlikely that the location information (e.g. country code) for each of the plurality of APs is incorrect and the mobile device may therefore determine that the most common location for those APs (i.e., the country code received the most frequently from a set of available APs) is the correct location. In other words, the mobile device ignores an AP's location information that is not in agreement with the location information commonly received from a majority of the detected APs. In one embodiment, reliance on the APs location to serve as an indication of the mobile device's location may be used only when the mobile device fails to detect a reliable GNSS location and does not have a cellular network connection (i.e. when using the MCC as the location determination mechanism). In another embodiment, the mobile device may request a neighbor report from one of the APs (e.g. a primary AP) which provides information about neighboring APs. If the country code of any neighboring AP differs from a country code of the primary AP, the neighbor report may include an indication of the difference between the country codes. For example, the neighbor report may include a Condensed Country String (IEEE 802.11-2012 section 8.4.2.39) that is present only if the country of the neighbor AP indicated by the BSSID differs from the country code of the primary AP that sent the neighbor report. Based on a plurality of identical Condensed Country String elements, the mobile device may assume the plurality represent the correct Condensed Country String to determine the location for the mobile device.

In another example, the current location of the mobile device may be determined based on indirect AP location information 208. The mobile device may also use information from a third party (e.g. a network server to which the AP is connected) to determine the location of the AP. In particular, IEEE 802.11 (e.g. IEEE 802.11u and IEEE 802.11v) may allow a mobile device to receive location information that includes the coordinates of the AP. For example, the mobile device may use the Access Network Query Protocol ("ANQP") element "AP Location Public Identifier URI" to request and receive a URI (e.g. an internet address—http://example.com/company/AP-locations.html) of an entity (e.g. a network server to which the AP is connected) that can then provide the location information of the AP. Accordingly, the location of the AP may be determined from information provided by this entity (e.g. AP-locations.html) to the mobile device, without directly relying on the AP itself. In an alternative embodiment, a new ANQP-element may be created which allows the location of the mobile device (e.g. using GNSS coordinates) to be included in an ANQP query that is sent from the mobile device to a network. This allows a response from this network, providing more detailed/accurate location and regulatory information for the mobile device. If the response provides suitable information that the mobile device can use for regulatory information, the mobile device can then proceed to attach to a Wi-Fi network. In other words, discovery communications that includes more detailed/accurate location information can be used by a mobile device when determining whether to join a particular Wi-Fi network. In another embodiment, indirect AP location determination may require the mobile device to query a location database for the MAC address of the AP. Location information would be received in response to the query, which would then be used by the mobile device for a second lookup in a lookup database. In alternative embodiments, the two databases (i.e., the location database and the lookup database) may be combined, which would then require the mobile device to perform only one lookup.

In another example, the current location of the mobile device may be determined based on cellular location technology 210. For example, the location may be determined, by the mobile device, based on cellular radio signals (in either uplink or downlink directions). The characteristics of these signals may be analyzed (e.g. time of arrival, angle of arrival or signal strength) in order to determine the coordinates of the mobile device. The mobile device may receive the cellular radio signals and analyze the characteristics of these cellular radio signals to determine its own location (for example using downlink cellular signals). Alternatively, the location of the mobile device may be determined within a network to which the device is connected (such as one or more entities within the cellular network), and the location may subsequently transmitted to the mobile device from the network via any suitable communication means. In another embodiment, the cellular location technology 210 may use information associated with the location of a base station to determine the location of the mobile device. There may be other mechanisms available to the mobile device that are used to determine the mobile device's location including the use of an accelerometer or compass sensor(s).

In one embodiment, once a location has been identified that differs from the AP location it is trying to associate with; the mobile device may communicate an error message either back to the AP and/or the network. This error message may be a notification that the AP is improperly configured. This notification (i.e., the error message) may be transmitted via any suitable communications technology. Further, the notification may be transmitted before or after a valid association has been made with another AP or other communications system.

Referring back to FIG. 1, after the current location of the mobile device is determined (as described with respect to FIG. 2) a lookup table or database is accessed in block 104. The lookup table may include different regulations respectively associated with different mobile device locations. In one embodiment, the lookup table lists various locations and for each of these locations, includes the regulations for that location. The lookup table may be any mechanism that is used for identifying regulations for a particular location. The lookup table may provide a mechanism for a mobile device to identify and comply with regulations without relying solely on the location/regulations identified from the AP to which the mobile device is in range of. As illustrated in FIG. 3, the lookup table or database may be preconfigured and stored within the mobile device, may have been downloaded (i.e., from a network) and stored locally on the mobile device, and/or may be stored on an network server or on any other node, device or entity and accessed by the mobile device via any suitable communications technology.

FIG. 3 illustrates processes for accessing a lookup table. The lookup table may be stored locally 302 at the mobile device. The lookup table may be relatively small (e.g. a text file) by only indicating regulations by location, such that local storage on the mobile device may not take an excessive amount of memory. The lookup table may be stored in the on-board memory of the mobile device or may be stored in an external storage mechanism (e.g. a secure disk ("SD") card or other storage device). Alternatively, the lookup table may be downloaded 304. The mobile device may determine that a lookup table is not stored in either on-board memory or an external storage mechanism coupled to the mobile device, and then may download the lookup table. The downloaded lookup table may be stored permanently with the mobile device (as in local storage 302) or may be stored temporarily (e.g. in RAM). The mobile device may download or update its table (for either local storage 302 or temporarily downloaded 304) upon discovering that location information associated with the mobile device (e.g. GNSS 202, MCC 204, AP country codes 206, indirect AP location 208, and/or cellular location technology 210) has changed since the mobile device's last power on, or following a sustained hibernation or sleep mode. In other words, a locally stored lookup table may be periodically updated and re-downloaded to maintain current local regulations and those updates may be periodic or based on mobile device activity (e.g. on start-up) or a change in geographic location of the mobile device. In another embodiment, the lookup table may not be stored locally, but may be accessed from a network server 306. In other words, information from the lookup table is retrieved from a network storage source, such as a local server, an online site or in cloud storage.

Referring back to FIG. 1, regulations for the determined location are identified from the lookup table in block 106. Once the regulations are identified for the determined location (i.e., the current location of the mobile device), the device may be modified (or restricted) in order to comply with the regulations. In particular, operation of the mobile device or operating parameters of the mobile device may be modified. For example, Wi-Fi operating parameters that may be subject to regulations may include the channel, frequency (e.g. 2.4 GHz or 5 GHz), licensed spectrum, and/or mode of operation. Other operating parameters that may be subject to regulations include signal strength and transmission power (e.g. maximum allowable transmit power). These operating parameters are merely exemplary and additional or fewer operating parameters may be subject to regulations that differ based on location. If a detected AP beacon includes parameters for operation in conflict with those regulations identified and received from the table, this beacon should be ignored by the mobile device to ensure compliance with local regulations. The mobile device may continue to examine AP beacons to find one with suitable parameters in compliance with the local regulations. In one embodiment, the identification of regulations 106 may be used for determining which networks that the mobile device can/cannot join (i.e., associate with). In particular, the mobile device should automatically refuse to connect with any AP that is improperly configured (e.g. not configured according to the identified regulations 106).

FIG. 4 illustrates a communication network. The network in FIG. 4 may be exemplary for illustrating the process for location determination and local regulation identification described with respect to FIGS. 1-3. In particular, the mobile device 402 (further described with respect to FIG. 6) may connect with a first AP (AP1 404) with a first Wi-Fi network 406 or a second AP (AP2 408) with a second network 410. The mobile device 402 may determine its location 102 as described with respect to FIG. 2. In particular, the mobile device may rely on GNSS 202 or MCC 204 to determine its location. However, if either GNSS or MCC is unavailable, other location information such as cellular location technology 210 or indirect AP location 208 may also be used. As described above, the AP country codes 206 associated with a plurality of APs (e.g. AP1 404 and AP2 408) may be used to ascertain the current location of the mobile device. In one embodiment, if the two APs have the same location (i.e., report the same AP country code 206), it may be determined by the mobile device that this location is correct. If the locations two APs are different (i.e., the AP country codes 206 received from the two APs differ), the mobile device may need an AP country code 206 from another AP, or other location source, to determine the majority location and evaluate which AP among the plurality is configured incorrectly.

In one embodiment, the identification of local regulations by the mobile device 402 can be used for selecting which networks (e.g. network 406 or 410) to associate with. In particular, if the mobile device 402 determines that a particular AP is not configured correctly according to the local regulations, the mobile device should refuse to connect/join to the network accessible via that AP. For example, if the mobile device 402 determines that AP1 404 is configured properly according to the local regulations, but AP2 408 is not configured according to the local regulations, then the mobile device 402 can refuse to associate to the network 410 of AP2 408. In other words, compliance with the local regulations can be used when deciding which networks/APs that the mobile device will refuse to associate with.

Figure 5:
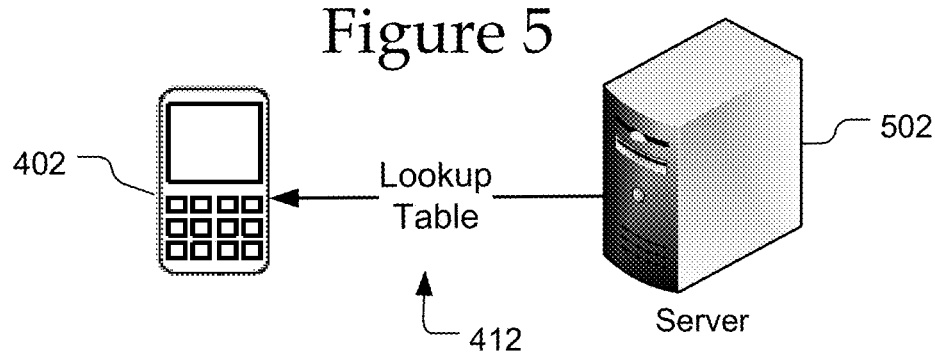
FIG. 5 illustrates an alternative communication network.

FIG. 4 further illustrates that the lookup table/database 412 is stored locally or downloaded to the mobile device 402. FIG. 5 illustrates an alternative communication network. In particular, FIG. 5 illustrates that the mobile device 402 may retrieve or access the lookup table 412 from a server 502. The server 502 may be an online site, cloud storage, or any other resource accessible over a network, such as the Internet. As described, the lookup table 412 may be accessed from the server 502 as needed (e.g. periodically or upon certain mobile device events, such as start-up, waking from sleep/hibernation mode, or relocation of the mobile device). The lookup table 412 may also be downloaded (rather than merely accessed) from the server 502 and stored at the mobile device 402.

Figure 6:
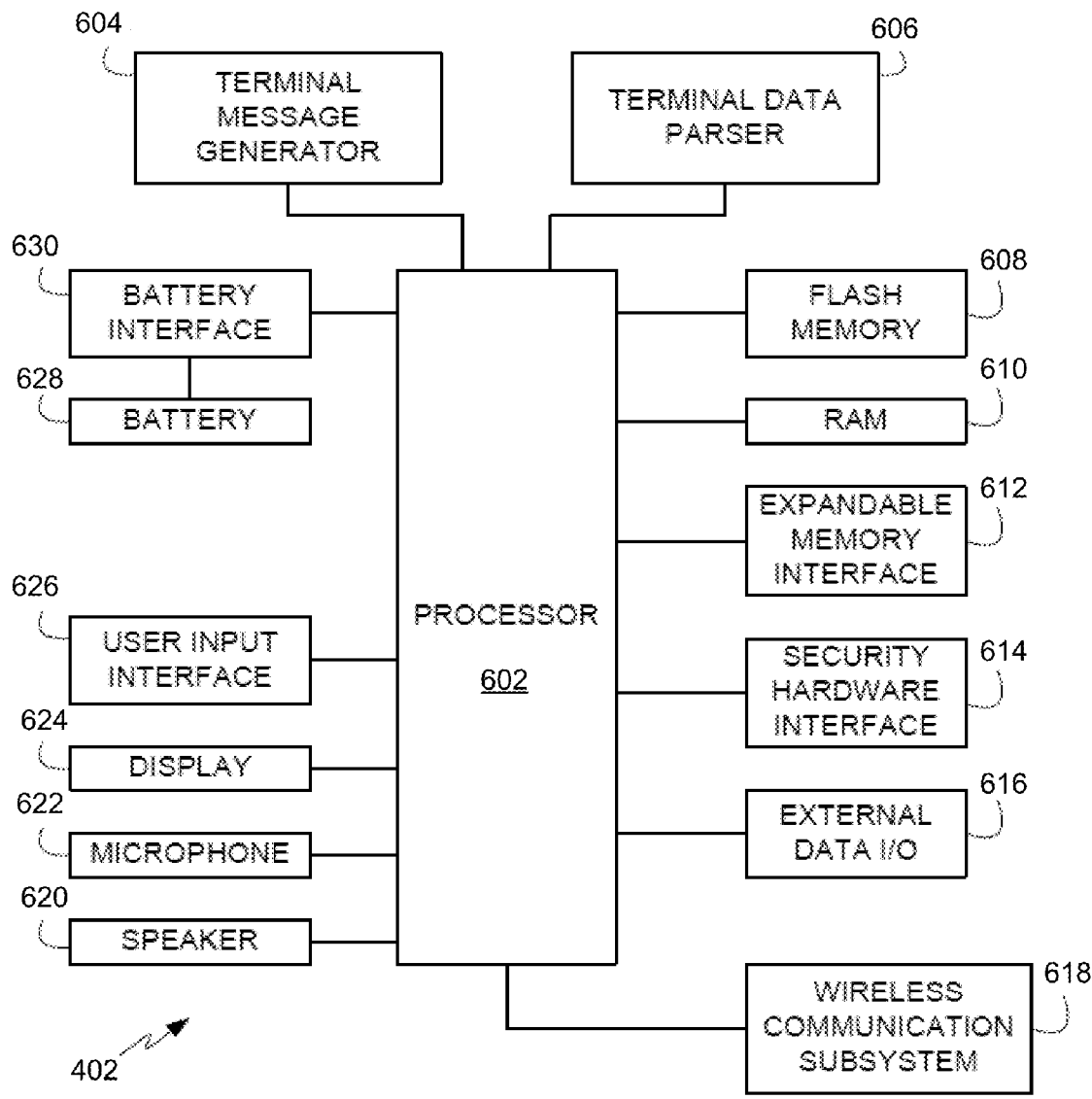
FIG. 6 illustrates a mobile device.

FIG. 6 illustrates the mobile device 402 as shown in FIGS. 4 and 5. The mobile device 402 may also be referred to as a wireless device, wireless local area network ("WLAN") device, station ("STA"), or mobile computing platform ("MCP"). The mobile device 402 may be any computing device that is operable to access a wireless network, such as a Wi-Fi network or a mobile cellular network. In the example of a Wi-Fi mobile device, the regulations to be complied with are Wi-Fi regulations for a particular location. The mobile device 402 is referred to throughout as a mobile device for simplicity.

The mobile device 402 includes a processor 602 that may be used to control the overall operation of the mobile device 402. The processor 602 may be implemented using a controller, a general purpose processor, a digital signal processor, dedicated hardware, or any combination thereof. The processor 602 may include a central processing unit, a graphics processing unit, a digital signal processor or other type of processing device. The processor 602 may be a component in any one of a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may operate in conjunction with a software program, such as code generated manually (i.e., programmed).

The mobile device 402 also includes a terminal message generator 604 and a terminal data parser 606. The terminal message generator 604 may generate messages and the terminal data parser 606 may be used to retrieve network information from memory (e.g., random access memory 610, etc.). For example, the terminal data parser 606 may request information (e.g. persistent state information for one or more groups) from a network/group.

In the illustrated embodiment, the terminal message generator 604 and the terminal data parser 606 are shown as separate from and connected to the processor 602. In alternative embodiments, the terminal message generator 604 and the terminal data parser 606 may be implemented in the processor 602 and/or in a wireless communication subsystem (e.g., a wireless communication subsystem 618). The terminal message generator 604 and the terminal data parser 606 may be implemented using any combination of hardware, firmware, and/or software. For example, one or more integrated circuits, discrete semiconductor components, and/or passive electronic components may be used. For example, the terminal message generator 604 and the terminal data parser 606, or parts thereof, may be implemented using one or more circuits, programmable processors, application specific integrated circuits, programmable logic devices, field programmable logic devices, etc.

The terminal message generator 604 and the terminal data parser 606, or parts thereof, may be implemented using instructions, code, and/or other software and/or firmware, etc. stored on a machine accessible medium and executable by, for example, a processor (e.g., the processor 602). The terminal message generator 604 or the terminal data parser 606 may be stored on or include a tangible storage medium or memory. For example, the terminal message generator 604 or the terminal data parser 606 may be implemented in software stored on a memory that is executable by the processor 602. Alternatively, the terminal message generator 604 and/or the terminal data parser 606 may be implemented in hardware with software functions. The memory for storing software associated with the terminal message generator 604 and/or the terminal data parser 606 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. In one embodiment, the memory may include the random access memory 610 for the processor 602, or may be an external storage device or database for storing data. Examples include a hard drive, compact disc ("CD"), digital video disc ("DVD"), memory card, memory stick, floppy disc, universal serial bus ("USB") memory device, or any other device operative to store user data. The memory is operable to store instructions executable by the processor 602.

The mobile device 402 may include a FLASH memory 608, a random access memory 610, and/or an expandable memory interface 612 coupled with the processor 602. The FLASH memory 608 may store computer readable instructions and/or data. The processor 602 may be coupled with the memory (e.g. the FLASH memory 608, or the RAM 610) for storing software instructions executable by the processor 602. The FLASH memory 608 or the RAM 610 may store the lookup table 412. The lookup table 412 may be stored locally (with updates) or may be downloaded as needed for temporary usage. When used temporarily, the lookup table 412 may be used from RAM 610. The memory may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The functions, acts or tasks illustrated in the figures or described herein may be performed by the programmed processor 602 executing the instructions stored in the memory. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The mobile device 402 may include a security hardware interface 614 to receive a SIM card from a wireless service provider. A SIM card may be used for communications including authentication of the mobile device 402 for establishing a connection with a WLAN-supported network. The mobile device 402 may be provided with an external data I/O interface 616. The external data I/O interface 616 may be used by a user to transfer information to the mobile device 402 through a wired medium. The information may include location information.

The mobile device 402 may include wireless communication subsystem 618 to enable wireless communications with other devices or with a Peer to Peer ("P2P") group/network. Although not shown, the mobile device 402 may also have a long-range communication subsystem to receive messages from, and send messages to, a cellular wireless network. In the illustrated examples described herein, the wireless communication subsystem 618 can be configured in accordance with the IEEE® 802.11 standard. In other example implementations, the wireless communication subsystem 618 may be implemented using a BLUETOOTH® radio, a ZIGBEE® device, a wireless USB device, an ultra-wideband radio, a Near Field Communications ("NFC") device, an ANT+ device or a Radio Frequency Identifier ("RFID") device. The mobile device may further include GNSS capabilities which may be part of the wireless communication subsystem 618 or another component of the mobile device 402.

The mobile device 402 may include a user interface for communicating to/from the device. The user interface may be separate component or it may include a speaker 620, a microphone 622, a display 624, and a user input interface 626. The display 624 may be a liquid crystal display, an organic light emitting diode, a flat panel display, a solid state display, a cathode ray tube, a projector, a printer or other now known or later developed display device for outputting determined information. The user input interface 626 may include alphanumeric keyboard and/or telephone-type keypad, a multi-direction actuator or roller wheel with dynamic button pressing capability, a touch panel, etc. The speaker, 620, the microphone 622, the display 624, the user input interface 626, and/or any combination thereof may be omitted in alternative embodiments. In one embodiment, the mobile device 402 is a battery-powered device and includes a battery 628 and a battery interface 630.

The system and process described may be encoded in a signal bearing medium, a computer readable medium such as a memory, programmed within a device such as one or more integrated circuits, and one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A method in a mobile device, the method comprising:
identifying a geographic location of the mobile device;
accessing a lookup table based on the location of the mobile device, the lookup table including local telecommunication regulations established by telecommunication regulatory bodies to authorize the mobile device to operate at the geographic location, wherein the telecommunications regulatory bodies are governmental authorities associated with the geographic location;
identifying, from the lookup table, the local telecommunication regulations associated with the geographic location of the mobile device;
determining whether an access point complies with at least one of the identified local telecommunication regulations; and
refusing to connect with the access point in response to determining that the access point does not comply with at least one of the identified local telecommunication regulations.

2. The method of claim 1 wherein the lookup table is stored locally at the mobile device.

3. The method of claim 2 wherein the lookup table is downloaded from a server to the mobile device and stored locally at the mobile device.

4. The method of claim 1 wherein identifying the geographic location comprises receiving information identifying the geographic location from a server.

5. The method of claim 4 wherein the lookup table is not stored locally at the mobile device but is accessed over a network from a server.

6. The method of claim 1 further comprising:
modifying operating parameters for the mobile device based on the at least one of the identified local telecommunication regulations.

7. The method of claim 6 wherein the operating parameters comprise a band, a channel, power, or transmit mask.

8. The method of claim 6 wherein the mobile device comprises a wireless local area network ("WLAN") device and the operating parameters comprise the local telecommunication regulations for at least one of a plurality of bands in which the WLAN device operates.

9. The method of claim 1 wherein the identifying a location comprises determining the geographic location based on at least one of satellite location technology, mobile country code, access point geographic location, access point country codes, indirect access point location, or cellular location technology.

10. The method of claim 1 further comprising connecting with the access point when the access point complies with the at least one of the identified local telecommunication regulations.

11. A wireless device, the device comprising:
a processor configured to:
determine a geographic location of the wireless device;
access a lookup table that includes local telecommunication regulations established by telecommunication regulatory bodies to authorize the mobile device to operate at the geographic location, wherein the telecommunications regulatory bodies are governmental authorities associated with the geographic location;

identify the local telecommunication regulations for the geographic location of the wireless device from the lookup table;

determine whether one or more access points comply with at least one of the identified local telecommunication regulations; and refuse to connect with an access point in response to determining that the access point does not comply with at least one of the identified local telecommunication regulations.

12. The wireless device of claim 11 wherein the lookup table is downloaded from a server to the wireless device and stored locally.

13. The wireless device of claim 11 wherein the lookup table is accessed over a network from a server.

14. The wireless device of claim 11 wherein the local telecommunication regulations comprise operating parameters for the wireless device that are modified based on the at least one of the identified local telecommunication regulations.

15. The wireless device of claim 14 wherein the operating parameters comprise a band, a channel, power, or transmit mask.

16. The wireless device of claim 14 wherein the wireless device comprises a wireless local area network ("WLAN") device and the operating parameters comprise the local telecommunication regulations for at least one of a plurality of bands in which the WLAN device operates.

17. The wireless device of claim 11 wherein the geographic location is determined based on at least one of satellite location technology, mobile country code, access point country codes, access point geographic location, indirect access point location, or cellular location technology.

18. A wireless local area network ("WLAN") device, the device comprising:
a processor configured to:
retrieve a lookup table stored with the WLAN device, wherein the lookup table includes local telecommunication regulations established by telecommunication regulatory bodies to authorize the mobile device to operate at a geographic location, wherein the telecommunications regulatory bodies are governmental authorities associated with the geographic location;
identify the local telecommunication regulations from the lookup table based on the geographic location of the WLAN device;
determine whether an access point complies with at least one of the identified local telecommunication regulations; and
refuse to connect with the access point in response to determining that the access point does not comply with at least one of the identified local telecommunication regulations.

19. The WLAN device of claim 18 wherein the processor is further configured to:
modify operation of the WLAN device to conform to the at least one of the identified local telecommunication regulations.

20. The wireless device of claim 11, wherein the processor is further configured to determine whether the lookup table is stored locally at the wireless device.

21. The WLAN device of claim 18, wherein the lookup table is downloaded from a server temporarily.

22. The method of claim 1, further comprising periodically updating the lookup table based on at least one of mobile device activity or a change in the geographic location of the mobile device.

23. The method of claim 1, wherein the lookup table is accessed over the network as needed upon a certain event.

* * * * *